United States Patent
Kimura et al.

(10) Patent No.: US 9,719,486 B2
(45) Date of Patent: Aug. 1, 2017

(54) SEAL DEVICE FOR HYDRAULIC CIRCUIT

(75) Inventors: Kenta Kimura, Susono (JP); Yuji Hattori, Gotemba (JP); Tomokazu Inagawa, Susono (JP); Takafumi Inagaki, Susono (JP); Yu Nagasato, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 330 days.

(21) Appl. No.: 14/240,540

(22) PCT Filed: Aug. 30, 2011

(86) PCT No.: PCT/JP2011/069573
§ 371 (c)(1),
(2), (4) Date: Feb. 24, 2014

(87) PCT Pub. No.: WO2013/030947
PCT Pub. Date: Mar. 7, 2013

(65) Prior Publication Data
US 2014/0223897 A1    Aug. 14, 2014

(51) Int. Cl.
*F15B 15/14* (2006.01)
*F03C 1/013* (2006.01)
(Continued)

(52) U.S. Cl.
CPC .......... *F03C 1/013* (2013.01); *F16D 25/0638* (2013.01); *F16D 25/12* (2013.01);
(Continued)

(58) Field of Classification Search
CPC .......... F16J 15/46; F16J 15/48; F15B 15/1466
See application file for complete search history.

(56) References Cited

U.S. PATENT DOCUMENTS

RE17,042 E  *  7/1928  Olson ............... F16J 15/32
                                                      277/467
2,820,653 A      1/1958  Yokel
(Continued)

FOREIGN PATENT DOCUMENTS

DE    39 06 282 A1    5/1990
JP    58 44529        3/1983
(Continued)

OTHER PUBLICATIONS

International Search Report Issued Nov. 22, 2011 in PCT/JP11/069573 Filed Aug. 30, 2011.
(Continued)

*Primary Examiner* — F. Daniel Lopez
(74) *Attorney, Agent, or Firm* — Oblon, McClelland, Maier & Neustadt, L.L.P.

(57) ABSTRACT

In a seal device for a hydraulic circuit, in which an oil passage that supplies hydraulic oil to or discharges the hydraulic oil from a hydraulic actuator operated by hydraulic pressure is formed over at least two members that relatively move, and a seal member that seals a gap between the two members in a liquid-tight manner is disposed in an interior of a groove section that is formed in at least either one of the two members, a communication section that allows the groove section to communicate with any portion of the oil passage such that the hydraulic oil in the interior of the groove section moves along with supply of the hydraulic oil to or discharge of the hydraulic oil from the hydraulic actuator is formed.

7 Claims, 7 Drawing Sheets

(51) Int. Cl.
*F16D 25/12* (2006.01)
*F16D 25/0638* (2006.01)
*F16J 15/16* (2006.01)

(52) U.S. Cl.
CPC ........... *F16J 15/16* (2013.01); *F15B 15/1466* (2013.01); *F16D 2300/0214* (2013.01); *F16D 2300/08* (2013.01)

(56) References Cited

U.S. PATENT DOCUMENTS

| | | | | |
|---|---|---|---|---|
| 4,795,128 | A | * | 1/1989 | Krasnov ............. F16K 31/1225 175/218 |
| 5,029,685 | A | | 7/1991 | Takase et al. |
| 7,572,839 | B2 | * | 8/2009 | Ota ................... B29C 35/0866 264/330 |
| 2005/0167234 | A1 | | 8/2005 | Aoki et al. |

FOREIGN PATENT DOCUMENTS

| | | |
|---|---|---|
| JP | 8-135797 A | 5/1996 |
| JP | 2010 151240 | 7/2010 |
| JP | 2012 97867 | 5/2012 |
| WO | WO 2005/033551 A1 | 4/2005 |
| WO | WO 2010/084853 A1 | 7/2010 |

OTHER PUBLICATIONS

Partial English Translation of Written Opinion Issued Nov. 22, 2011 in PCT/JP11/069573 Filed Aug. 30, 2011.

\* cited by examiner

SEAL DEVICE FOR HYDRAULIC CIRCUIT

TECHNICAL FIELD

The present invention relates to a hydraulic circuit in which an oil passage for supplying hydraulic oil to or discharging hydraulic oil from a hydraulic actuator is formed over at least two members and particularly to a seal device that blocks the oil passage against a drain portion between the two members to maintain a liquid-tight state.

BACKGROUND ART

Hydraulic pressure can be used for transmitting large power or force via a free path and for transmitting signals in accordance with the magnitude of the pressure and is thus used in various apparatuses. For example, hydraulic pressure is used for switching or setting transmission paths of power or securing a transmission torque capacity in a power train of a vehicle. Japanese Patent Application Publication No. 2010-151240 (JP 2010-151240 A) discloses an example of such a kind of hydraulic pressure control device. The device disclosed in this publication is a hydraulic pressure control device for a belt type continuously variable transmission which is configured such that a hydraulic pressure chamber (hydraulic actuator) is provided in each of one pulley (primary pulley) and the other pulley (secondary pulley) on which a belt is wound, hydraulic oil is supplied to or discharged from the primary pulley to change the groove width thereof and to thereby set a gear ratio, hydraulic oil corresponding to a demand drive amount represented by an accelerator operation amount or the like is supplied to the secondary pulley to set belt squeezing force corresponding to the torque to be transmitted.

Further, a supply-side electromagnetic switch valve and a discharge-side electromagnetic switch valve are connected to the hydraulic pressure chamber of each of the pulleys. The hydraulic circuit including the switch valves is configured with through holes, groove sections, and so forth that are formed in a rotational shaft, a fixed section supporting that, and so forth. Thus, the hydraulic circuit includes a section formed over two members that relatively rotate or slide in an axial direction. A prescribed clearance is formed between the two members for their smooth relative movement (relative motion). This may result in leakage of hydraulic oil from the clearance between the two members in a portion where the hydraulic circuit crosses the two members. Accordingly, a seal member is provided to the clearance in order to secure liquid tightness or air tightness, similarly to one in a common hydraulic apparatus.

The seal member is to tightly fit on each of the two members that relatively move and to thereby restrict leakage of hydraulic fluid. The seal member is thus formed of a material having high wear resistance and as small frictional resistance as possible so that the seal member is suitable for its original function. This kind of seal member is made tightly fitted on the two members not only by own elastic force but also pressure from a fluid (or hydraulic oil) to be sealed. Therefore, despite the small friction coefficient, high pressure for tight fitting or a high relative speed between the two members may result in a temperature increase due to frictional heat. This may cause a decrease in durability of the seal member or a decrease in durability of the fluid contacting the seal member.

SUMMARY OF THE INVENTION

The present invention has been made in consideration of above technical problems, and an object thereof is to provide a seal device for hydraulic circuit that can restrict a temperature increase of at least either one of a seal member and hydraulic oil and a decrease in durability due to the temperature increase.

To achieve the object, the present invention provides a seal device for a hydraulic circuit, in which an oil passage that supplies hydraulic oil to or discharges the hydraulic oil from a hydraulic actuator operated by hydraulic pressure is formed over at least two members that relatively move, and a seal member that seals a gap between the two members in a liquid-tight manner is disposed in an interior of a groove section that is formed in at least either one of the two members, and in which a communication section that allows the groove section to communicate with any portion of the oil passage such that the hydraulic oil in the interior of the groove section moves along with supply of the hydraulic oil to or discharge of the hydraulic oil from the hydraulic actuator is formed. The oil passage includes a supply passage that supplies the hydraulic oil to the hydraulic actuator and a discharge passage that discharges the hydraulic oil from the hydraulic actuator, and the communication section includes a supply communication section that communicates with the supply passage and a discharge communication section that communicates with the discharge passage.

Further, the present invention provides a seal device for a hydraulic circuit, in which an oil passage that supplies hydraulic oil to or discharges the hydraulic oil from a hydraulic actuator operated by hydraulic pressure is formed over at least two members that relatively move, and a seal member that seals a gap between the two members in a liquid-tight manner is disposed in an interior of a groove section that is formed in at least either one of the two members, and in which the oil passage includes a supply passage that supplies the hydraulic oil to the hydraulic actuator and a discharge passage that discharges the hydraulic oil from the hydraulic actuator, and the seal device further includes: a supply communication section that allows communication between the groove section and the supply passage; and a discharge communication section that allows communication between the groove section and the discharge passage.

The two members may be a shaft member and a rotating member that is fitted on an outer peripheral side of the shaft member and has the hydraulic actuator, the supply passage may be formed to pass through an interior of the shaft member, to open on an outer peripheral surface of the shaft member, and further to pass through a section of the rotating member so as to allow communication between the opening and the hydraulic actuator, the discharge passage may be formed to pass through the interior of the shaft member, to open in a position that is offset from the opening of the supply passage in a circumferential direction, and further to pass through a section of the rotating member so as to allow communication between the opening and the hydraulic actuator, and the seal member may be disposed between the shaft member and the rotating member.

Further, the supply passage and the discharge passage may be formed in symmetrical positions about a center of the shaft member in an outer peripheral section of the shaft member, the supply communication section may be formed to adjoin the supply passage, and the discharge communication section may be formed to adjoin the discharge passage.

The rotating member may be a clutch drum that houses in an interior thereof a piston that moves in an axial direction by hydraulic pressure.

On one hand, the hydraulic actuator may include a cylinder section that is formed with an inner cylinder section, an outer cylinder section, and a side wall section, the side wall section connecting the inner cylinder section and the outer cylinder section; and a piston that is housed in an interior of the cylinder section to reciprocally move in a liquid-tight manner, the inner cylinder section may be fitted on a hollow shaft section in which the hydraulic oil flows through a hollow section on an inner peripheral side, the oil passage may be formed to pass through the hollow shaft section and the inner cylinder section in a radial direction, and the groove section may be formed on both sides across the oil passage in an outer peripheral section of the hollow shaft section.

On the other hand, the communication section may be formed with a through hole that allows communication between the groove section and the hollow section. Alternatively, the communication section may be formed with a notch in which the side wall section on the oil passage side of the side wall section that defines the groove section is notched to allow communication between the groove section and the oil passage.

Further, the seal device for a hydraulic circuit may further include a pressure increase valve that selectively allows communication between the supply passage and a hydraulic pressure source and a pressure reduction valve that selectively allows communication between the discharge passage and a prescribed drain portion.

In such a configuration, the seal device for a hydraulic circuit may be configured such that when an estimation that a temperature of the hydraulic oil contacting the seal member increases to a prescribed value or higher is made, at least either one of the pressure increase valve and the pressure reduction valve is opened, and flow of the hydraulic oil is caused in the oil passage and the groove section that communicates with the oil passage via the communication section.

Further, the seal device for a hydraulic circuit may be configured such that both of the pressure increase valve and the pressure reduction valve are opened to discharge a portion of the hydraulic oil in the oil passage to the drain portion via the groove section.

In addition, the seal device for a hydraulic circuit may be configured such that the estimation that the temperature of the hydraulic oil contacting the seal member increases to the prescribed value or higher is made according to heat generation energy due to frictional slide of the seal member or a detected temperature of a periphery of the seal member.

The seal device for a hydraulic circuit may be configured such that a flow amount of the hydraulic oil to be discharged to the drain portion is obtained according to a result of the estimation.

When the flow amount is obtained in such a manner, the pressure increase valve and the pressure reduction valve may be opened so as to obtain the flow amount obtained according to the result of the estimation. The control for opening the pressure increase valve and the pressure reduction valve may be performed by controlling either one of opening areas and an opening time of the pressure increase valve and the pressure reduction valve.

In the present invention, the gap between the two members that perform relative motion such as rotation and linear movement are sealed by the seal member in a liquid-tight manner. Accordingly, when relative motion occurs between the members, the seal member slides on at least either one of the members, and heat is generated by friction. Further, when the hydraulic oil is supplied to the hydraulic actuator or the hydraulic oil is discharged from the hydraulic actuator, the hydraulic oil flows through the oil passage. The groove section that houses the seal member communicates with the oil passage through the communication section, and the hydraulic oil in the groove section thus flows along with flow of the hydraulic oil through the oil passage. More specifically, the hydraulic oil in the groove section is replaced. Therefore, heat generated by friction between the seal member and either one of the members is carried away from the periphery of the seal member or the groove section. In other words, a cooling effect is caused by the flow of the hydraulic oil. As a result, a temperature increase of the seal member and the hydraulic oil can be restricted, and along with that a decrease in durability of at least either one of the seal member and the hydraulic oil can be restricted. Further, because the cooling effect can be caused along with an operation of the hydraulic actuator, unnecessary discharge of the hydraulic oil and an increase in energy loss along with that can be avoided or restricted.

Moreover, in the present invention, in a case where the supply passage and the supply communication section communicating therewith and the discharge passage and the discharge communication section communicating therewith are independently provided from each other, the flow of the hydraulic oil in the groove section can actively be caused. Consequently, discharge of heat and the cooling effect can further be facilitated.

In addition, in a case where the supply passage is allowed to communicate with the hydraulic pressure source via the pressure increase valve and the discharge passage is allowed to communicate with the drain portion via the pressure reduction valve, the pressure increase valve and the pressure reduction valve are appropriately opened or closed, the hydraulic oil in the periphery of the seal member can thereby be made flow to cause the cooling effect. In particular, the pressure increase valve and the pressure reduction valve are controlled to open or close while the temperature increase of the hydraulic oil on the seal member and in its periphery is estimated, and an excessive temperature increase can thereby be restricted. Such open-close control may be performed by controlling the opening areas and opening time of the pressure increase valve and the pressure reduction valve according to the flow amount on the basis of the estimation. Accordingly, the right degree of cooling effect can be caused.

MODES FOR CARRYING OUT THE INVENTION

Figure 1:
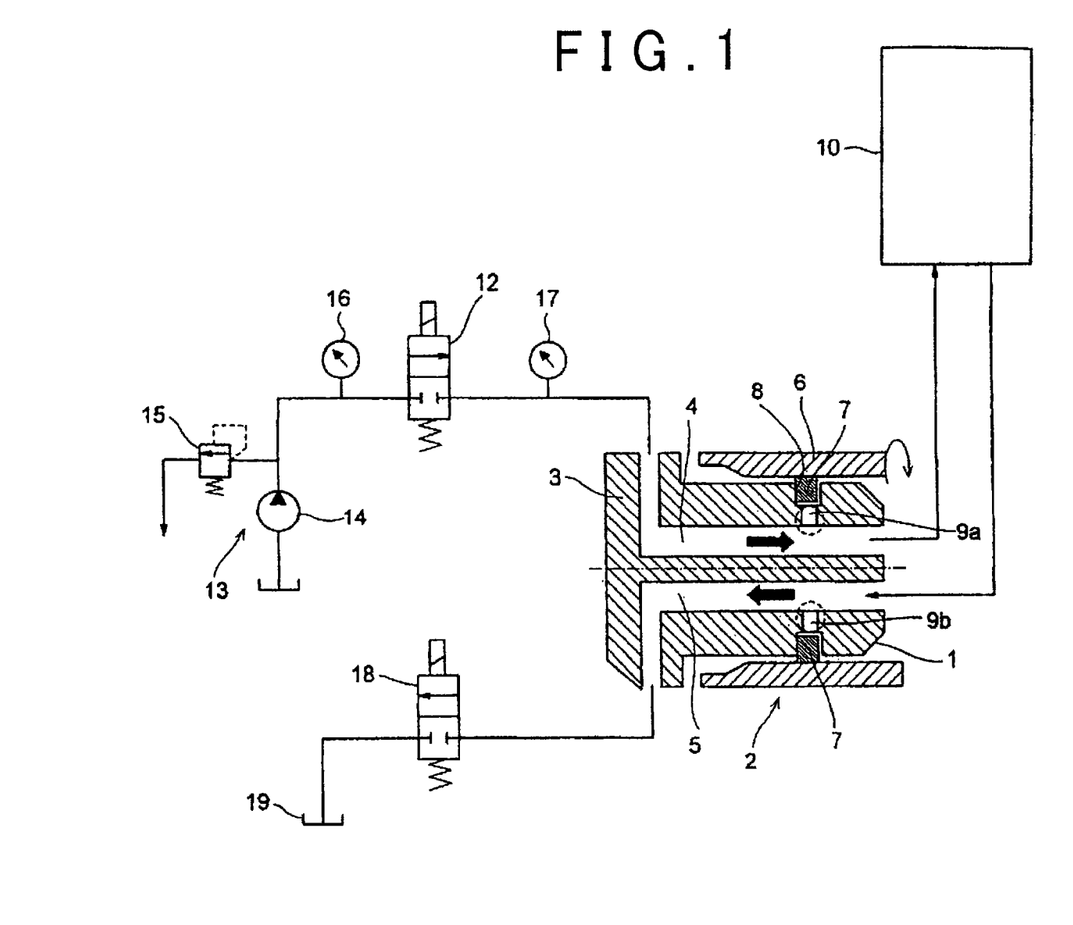
FIG. 1 is a schematic diagram showing an example of a seal device in accordance with the present invention.

One example of a seal device in accordance with the present invention will be described in detail with reference to drawings. FIG. 1 schematically shows the seal device, in which a housing member 2 corresponding to a rotating member in the present invention is rotatably fitted on an outer peripheral side of a fixed shaft 1. The fixed shaft 1 is, for example, a boss formed as a section of a transmission case 3 or a shaft mounted on the boss, in an interior of which oil passages are formed along an axial direction. The oil passages are a supply passage 4 and a discharge passage 5 in the example shown in FIG. 1. The supply passage 4 and the discharge passage 5 are independently defined from each other. Accordingly, the fixed shaft 1 corresponds to a shaft member or a hollow shaft section in the present invention. An oil passage communicating with the supply passage 4 and an oil passage communicating with the discharge passage 5 are independently formed from each other in an interior of an outer wall section of the transmission case 3.

The housing member 2 is a rotating member such as a clutch drum, a connecting drum, or a brake drum. A cylindrical section 6 having an inner diameter generally same as an outer diameter of the fixed shaft 1 is formed as a section of the housing member 2. The cylindrical section 6 is rotatably fitted on an outer peripheral side of the fixed shaft 1 with a slight gap that allows relative movement. Further, a seal member 7 is disposed between an inner peripheral surface of the cylindrical section 6 and an outer peripheral section of the fixed shaft 1. The seal member 7 is a conventionally known seal ring and is fitted in an annular groove 8 formed in the outer peripheral section of the fixed shaft 1. In the example shown in FIG. 1, the seal member 7 is a belt-shaped material or a wire-shaped material with a rectangular cross section that is formed in an annular shape. Meanwhile, the groove section 8 is formed to have a rectangular cross section with a slightly larger width than the width of the seal member 7. Further, a whole outer peripheral surface of the seal member 7 tightly fits on an inner peripheral surface of the housing member 2. The seal member 7 is pressed to an inner peripheral surface on a low pressure side (left side in FIG. 1) of inner peripheral surfaces of the groove section 8 to tightly fit thereon. As a result, the seal member 7 seals a gap between the fixed shaft 1 and the housing member 2 in a liquid-tight manner.

The groove 8 is positioned on an outer peripheral side of the above-described supply passage 4 and discharge passage 5. Communication holes 9a, 9b that allow a bottom of the groove section 8 to communicate with the supply passage 4 and the discharge passage 5, respectively, are formed to pass through the fixed shaft 1 in a radial direction. The communication holes 9a, 9b correspond to communication sections in the present invention. Accordingly, an interior of the groove 8 communicates with the oil passages via the communication holes 9a, 9b.

Further, the supply passage 4 is the oil passage for supplying hydraulic oil to a hydraulic actuator 10. The discharge passage 5 is the oil passage for discharging the hydraulic oil from the hydraulic actuator 10. The oil passages communicate with prescribed portions of the hydraulic actuator 10. That is, the hydraulic actuator 10 is a hydraulic apparatus that is configured to be operated by supply or discharge of the hydraulic oil, and an example is a hydraulic pressure chamber of a moveable pulley in a hydraulic clutch, a hydraulic brake, or a belt-type continuously variable transmission. In the example shown in FIG. 1, the housing member 2 described above constitutes a section of the hydraulic actuator 10. Accordingly, the supply passage 4 and the discharge passage 5 that correspond to the oil passages in the present invention open on an outer peripheral surface of the fixed shaft 1 and are formed over two members that are the fixed shaft 1 and the housing member 2 that relatively rotates with respect to the fixed shaft 1. Thus, the supply passage 4 and the discharge passage 5 cross a gap on the right side (so-called high pressure side) of seal member 7 in FIG. 1 in the gap between the fixed shaft 1 and the housing member 2 and thereby communicate with the gap. Because the gap between the fixed shaft 1 and the housing member 2 is sealed by the seal member 7, the supply passage 4 and the discharge passage 5 do not communicate with the outside or a drain portion. In other words, the supply passage 4 and the discharge passage 5 are configured such that the hydraulic oil does not leak from the supply passage 4 and the discharge passage 5 to the outside or the drain portion.

Next, a configuration of the hydraulic circuit including the supply passage 4 and the discharge passage 5 for supplying the hydraulic oil to or discharging the hydraulic oil from the hydraulic actuator 10 will be described. The supply passage 4 is connected to a hydraulic pressure source 13 via a pressure increase valve 12. In the example shown in FIG. 1, the hydraulic pressure source 13 is configured with an oil pump 14 and a pressure regulation valve 15 that regulates a discharge pressure to a line pressure as main components and configured to supply the line pressure regulated by the pressure regulation valve 15 to the supply passage 4 via the pressure increase valve 12. A drain pressure from the pressure regulation valve 15 is supplied to a low pressure section such as lubricated portions and a torque converter which is not shown.

The pressure increase valve 12 is an electromagnetic valve that is electrically controlled to open or close and is configured to open when energized and close when electric current is blocked, for an example. A valve which simply opens or closes, a valve in which opening is adjustable, a valve which can control a flow rate, a duty valve which can change a ratio between open and close, or the like can be employed as the pressure increase valve 12. A valve of normal open type that closes when energized and opens when electric current is blocked may be used for the pressure increase valve 12 instead of a valve of normal close type that opens when energized and closes when electric current is blocked. A line pressure sensor 16 is connected to an input side of the pressure increase valve 12, and a control pressure sensor 17 is connected to an output side. In other words, the hydraulic pressure in the hydraulic actuator 10 is detected by the control pressure sensor 17.

Meanwhile, the discharge passage 5 communicates with a prescribed drain portion 19 via a pressure reduction valve 18. The drain portion 19 is an interior of the transmission case, an oil pan, or the like, that is, a portion open to the atmosphere. Further, the pressure reduction valve 18 is, similarly to the above-described pressure increase valve 12, an electromagnetic valve that is electrically controlled to open or close and is configured to open when energized and close when electric current is blocked, for an example. The valve which simply opens or closes, the valve which can adjust opening, the valve which can control the flow rate, the duty valve which can change the ratio between open and close, or the like can be employed as the pressure reduction valve 18. The valve of normal open type that closes when energized and opens when electric current is blocked may be used for the pressure reduction valve 18 instead of the valve of normal close type that opens when energized and closes when electric current is blocked.

A function of the seal device described above and shown in FIG. 1 will be described. The oil pump 14 is driven by an engine, a motor, or the like which is not shown to discharge the hydraulic oil, and its hydraulic pressure is regulated to the line pressure by the pressure regulation valve 15. When the pressure increase valve 12 is opened in a state where the line pressure is generated, the hydraulic oil is supplied to the hydraulic actuator 10 via the supply passage 4. When the hydraulic pressure reaches a target prescribed pressure in the actuator 10, the pressure increase valve 12 is closed. Because the hydraulic oil is delivered to portions that communicate with the supply passage 4 during a process of the supply, the hydraulic oil is filled not only in the interior of the hydraulic actuator 10 but also the discharge passage 5, the groove section 8, and the communication holes 9a, 9b. In this state, portions that communicate with the oil passages of the above-described gap between the fixed shaft 1 and the housing member 2, that is, portions on the right side of the seal member 7 in FIG. 1 are filled with the hydraulic oil and at high pressure. On the other hand, a side open to the atmosphere, that is, portions on the left side of the seal member 7 in FIG. 1 is at low pressure. Accordingly, the outer peripheral surface of the seal member 7 slidably contact on the inner peripheral surface of the housing member 2 in a liquid-tight manner and is pressed to and contact a side wall surface on the low pressure side in the groove section 8 in a liquid-tight manner. In other words, the gap between the fixed shaft 1 and the housing member 2 is sealed by the seal member 7 in a liquid-tight manner, thereby inhibiting the hydraulic oil from leaking from the above-described oil passages, the hydraulic actuator 10, and the like.

When the hydraulic actuator 10 is supplied with the prescribed hydraulic oil and operating, an apparatus such as the transmission including the hydraulic circuit is in an operating state, and the housing member 2 thus rotates with respect to the fixed shaft 1. A sealed state obtained by the seal member 7 is maintained in such a case. Because the sealed state is maintained by slidable contact of the seal member 7 with the fixed shaft 1 and the housing member 2, heat is generated by friction on slide surfaces thereof.

Meanwhile, a demand hydraulic pressure in the hydraulic actuator 10 varies according to the operating state of the apparatus such as the transmission, and the pressure increase valve 12 and the pressure reduction valve 18 are opened or closed so as to obtain the demand hydraulic pressure. In other words, in order to increase the control pressure, the pressure increase valve 12 is opened while the pressure reduction valve 18 is closed. On the other hand, in order to reduce the control pressure, the pressure reduction valve 18 is opened while the pressure increase valve 12 is closed. Such open-close control can be made by feedback control of the pressure increase valve 12 and the pressure reduction valve 18 according to the deviation between target hydraulic pressure and hydraulic pressure detected by the control pressure sensor 17. When the hydraulic pressure in the hydraulic actuator 10 is increased or reduced as described above, the hydraulic oil flows through the above-described supply passage 4 and discharge passage 5. Because the supply passage 4 and the discharge passage 5 communicate with the groove section 8 through the communication holes 9a, 9b, flow of the hydraulic oil that passes through the groove section 8 via the communication holes 9a, 9b is generated along with flow of the hydraulic oil through the supply passage 4 and the discharge passage 5. In other words, the hydraulic oil which has been stagnant in the interior of the groove section 8 flows away, and the hydraulic oil is replaced. Consequently, the hydraulic oil at an increased temperature in the groove section 8 flows out and carries heat away, and the hydraulic oil at a lower temperature is then supplied to the groove section 8. Heat is carried away from peripheries of the groove section 8 and the seal member 7 by such replacement of the hydraulic oil, thereby causing a cooling effect by the hydraulic oil.

In the seal device in accordance with the present invention, because frictional heat is carried away as described above and the cooling effect is thus provided, an excessive temperature increase of the seal member 7 and the hydraulic oil can be prevented or restricted. As a result, durability of the seal member 7 and the hydraulic oil can be improved, or a decrease in durability can be prevented or restricted. Further, the cooling effect in the seal device in accordance with the present invention is caused by the flow of the hydraulic oil in response to the change in the control pressure but not by simple leakage of the hydraulic oil. Therefore, leakage of the hydraulic oil and energy loss due to the leakage can be prevented or restricted.

Figure 2:
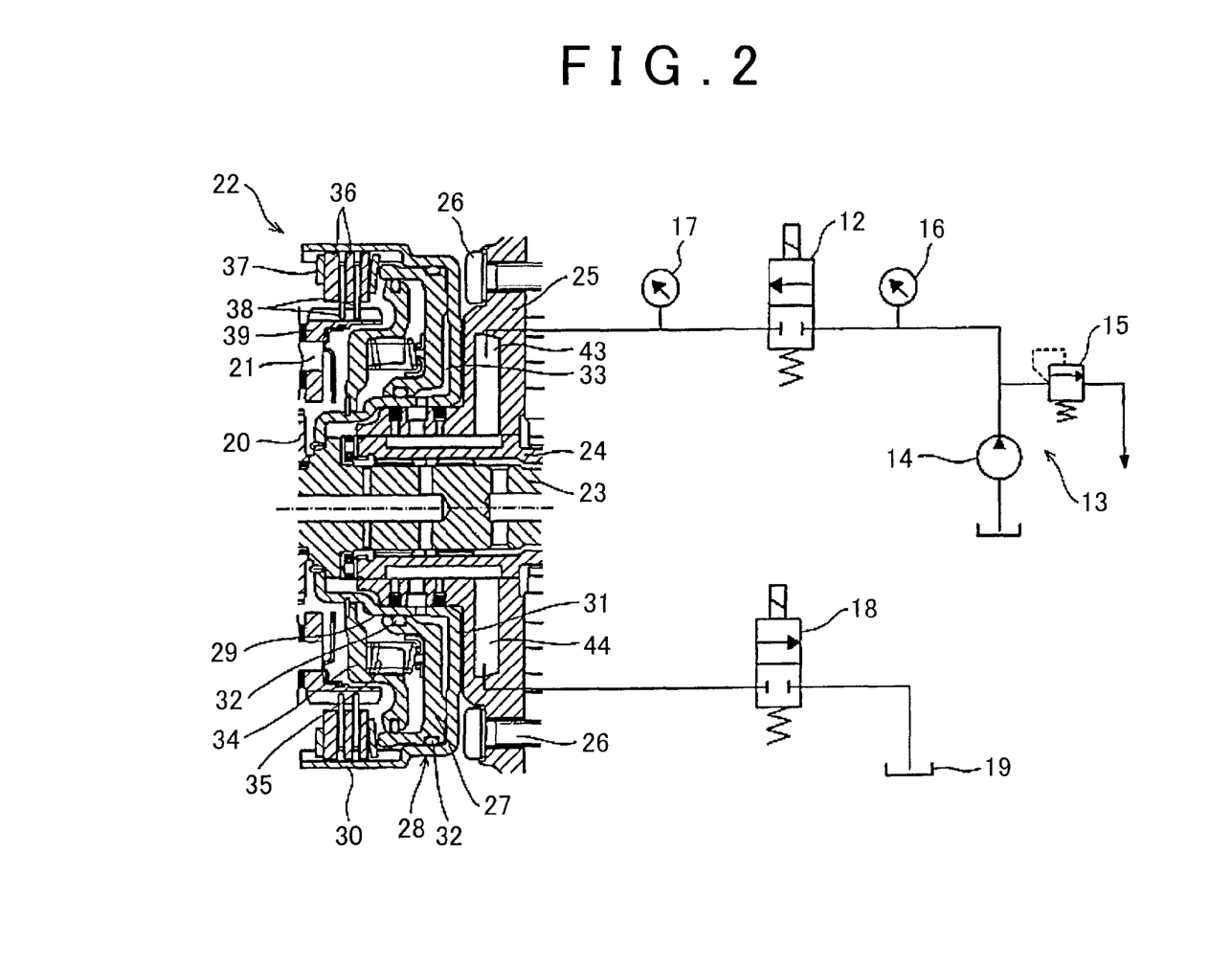
FIG. 2 is a cross-sectional view showing an example where the present invention is applied to a seal device for a hydraulic circuit in a forward-reverse switching mechanism.
Figure 3:
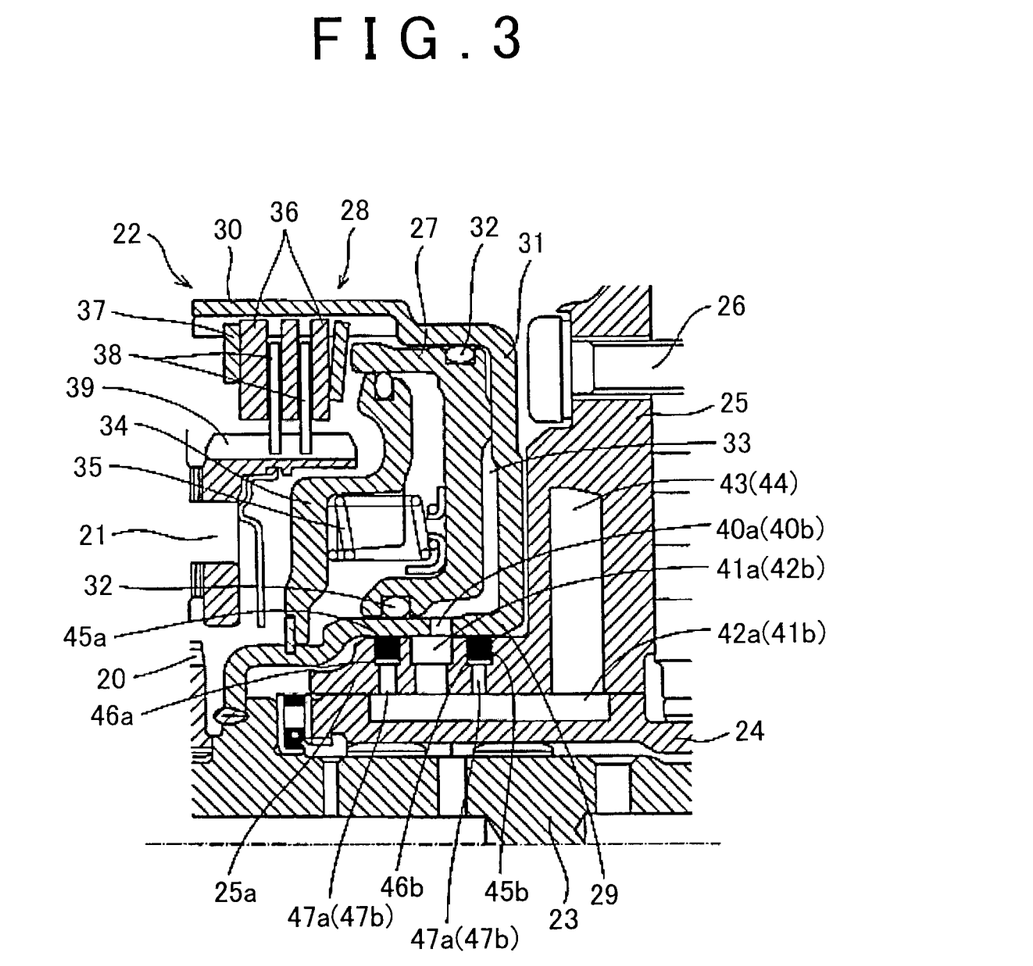
FIG. 3 is a cross-sectional view showing a clutch section of the mechanism.

The seal device in accordance with the present invention can widely be applied to common hydraulic circuits in transmissions for a vehicle and various industrial machines. As an example of such application, an example will be described where the seal device is applied to a forward-reverse switching mechanism in a transmission for a vehicle. FIG. 2 shows an example where the present invention is applied to the hydraulic circuit in the forward-reverse switching mechanism configured with a planetary gear mechanism (more specifically, double-pinion type planetary gear mechanism) as a main component. The forward-reverse switching mechanism has a sun gear 20 as an input element, a carrier 21 as an output element, and a ring gear (not shown) as a reaction force element. The sun gear 20 and the carrier 21 are coupled by a forward clutch 22 to set a forward travel state, and the ring gear is fixed by a brake which is not shown to set a reverse travel state. In other words, as shown in FIG. 3, the sun gear 20 is mounted on a turbine shaft (or input shaft) 23 integrated with a turbine runner of a torque converter (neither shown). The turbine shaft 23 is inserted in and passes through an interior of a stator shaft 24 that is a fixed shaft holding a stator (not shown) of the torque converter. The turbine shaft 23 and the stator shaft 24 correspond to the shaft member in the present invention.

Further, the stator shaft 24 is inserted in an inner peripheral side of an oil pump cover 25 and tightly fits in the oil pump cover 25. The oil pump cover 25 is to close one side section of the oil pump 14 that receives power from a pump impeller (not shown) of the torque converter to rotate and thereby generates hydraulic pressure and is fixed to a support section integrally formed in the transmission case (neither shown) by bolts 26.

The forward clutch 22 is disposed between the oil pump cover 25 and the planetary gear mechanism constituting the forward-reverse switching mechanism. The forward clutch 22 is a multiple disc type engagement mechanism that becomes an engaged state when the hydraulic oil is supplied and the piston 27 advances and becomes a disengaged state when the hydraulic oil is discharged and the piston 27 retreats. A clutch drum 28 that houses the piston 27 and allows its advance and retreat is provided. The clutch drum 28 corresponds to a rotating member in the present invention and is configured with an inner cylinder section 29 that fits on a boss 25a formed in the oil pump cover 25 and is coupled to the turbine shaft 23, an outer cylinder section 30 that is formed in a cylindrical shape having a larger diameter than the inner cylinder section 29, and a side wall section 31 that connects the inner cylinder section 29 and the outer cylinder section 30 together at one ends of their axial directions. As shown in FIGS. 2 and 3, the clutch drum 28 is formed in a hollow annular shape that opens toward the planetary gear mechanism side. The piston 27 is housed in an interior of a hollow annular cylinder section formed with the inner cylinder section 29, the outer cylinder section 30, and the side wall section 31. O-rings 32 are put on an inner peripheral section and an outer peripheral section of the piston 27 to secure liquid tightness between the piston 27 and the cylinder section. In other words, a space between the piston 27 and the side wall section 31 serves as a hydraulic pressure chamber 33.

A retainer 34 fixed to the inner cylinder section 29 is disposed on a front side (opposite side to the side wall section 31) of the piston 27. A return spring 35 that presses the piston 27 toward the side wall section 31 side is disposed between the retainer 34 and the piston 27. Further, a plurality of clutch plates 36 are spline-fitted to portions adjacent to an opening end of an inner peripheral surface of the outer cylinder section 30. A stopper ring 37 prevents the clutch plates 36 from falling. Moreover, a plurality of clutch discs 38 are provided to be interposed between the clutch plates 36. The clutch discs 38 are spline-fitted to a clutch hub 39 that is integrally formed with carrier 21. Thus, the forward clutch 22 is configured such that the piston 27 advances to squeeze the clutch plates 36 and the clutch discs 38 to the stopper ring 37, the clutch plates 36 and the clutch discs 38 are thereby brought into frictional contact with each other, and the sun gear 20 and the carrier 21 are thereby coupled together to enable torque transmission.

The forward clutch 22 or the hydraulic pressure chamber 33 corresponds to the hydraulic actuator in the present invention. The hydraulic oil is supplied to and discharged from the hydraulic pressure chamber 33 via the pump cover 25 and the stator shaft 24. Specifically, two through holes 40a, 40b serving as oil passages that pass through from an inner peripheral surface of the inner cylinder section 29 to the hydraulic pressure chamber 33 are formed in the inner cylinder section 29 that fits on the boss 25a of the pump cover 25. The through holes 40a, 40b are formed in positions (symmetrical positions about the center of an inner cylinder section 29) that are offset by a prescribed angle (for example, 180°) from each other in a circumferential direction of the inner cylinder section 29. Further, in the boss 25a, two through holes 41a, 41b are formed to pass through from an outer peripheral surface to an inner peripheral surface as oil passages that communicate with the through holes 40a, 40b. Thus, the through holes 41a, 41b are also formed in positions (symmetrical positions about the center of the boss 25a) that are offset by a prescribed angle (for example,) 180° from each other in a circumferential direction of the boss 25a. Further, hollow sections 42a, 42b that are recessed in prescribed lengths in an axial direction are formed in two portions in an outer peripheral section of the stator shaft 24 that tightly fits on an inner peripheral side of the boss 25a. The one hollow section 42a communicates with the one through hole 41a in the boss 25a. The other hollow section 42b communicates with the other through hole 41b in the boss 25a. The hollow sections 42a, 42b are formed in positions (symmetrical positions about the center of the stator shaft 24) that are offset by a prescribed angle (for example, 180°) in a circumferential direction of the stator shaft 24. A supply passage 43 that opens on an inner peripheral surface of the pump cover 25 and communicates with the one hollow section 42a is formed in the interior of the pump cover 25. The hydraulic pressure source 13 is connected to the supply passage 43 via the above-described pressure increase valve 12. Further, a discharge passage 44 that opens on the inner peripheral surface of the pump cover 25 and communicates with the other hollow section 42b is formed in a portion in the interior of the pump cover 25 that is different from the portion where the supply passage 43 is formed. The discharge passage 44 communicates with the prescribed drain portion 19 via the above-described pressure reduction valve 18.

In a configuration shown in FIGS. 2 and 3, the one pair of through holes 40a, 41a and the one hollow section 42a that communicate with each other serve as the oil passage for supplying the hydraulic oil to the hydraulic pressure chamber 33. The other pair of through holes 40b, 41b and the other hollow section 42b that communicate with each other serve as the oil passage for depressurizing the hydraulic pressure chamber 33. Accordingly, the oil passages are formed over the boss 25a and the clutch drum 28 (particularly the inner cylinder section 29) as two members that relatively move (rotate) and cross a slight gap between the two members. Seal members (seal rings) 45a, 45b are provided to prevent leakage of the hydraulic oil via the gap. In other words, groove sections 46a, 46b in a similar configuration to the above-described groove section 8 shown in FIG. 1 are formed on both sides across opening ends of the through holes 41a, 41b in an outer peripheral section of the boss 25a, and the seal members 45a, 45b are disposed on the respective groove sections 46a, 46b. Further, a communication hole 47a that allows communication between the groove section 46a, 46b and the one hollow section 42a formed in the stator shaft 24 is formed to pass through the boss 25a in its radial direction. Moreover, a communication hole 47b that allows communication between the groove section 46a, 46b and the other hollow section 42b formed in the stator shaft 24 is formed to pass through the boss 25a in its radial direction. The communication hole 47a of the communication holes 47a, 47b that communicates with the hollow section 42a functioning as the oil passage for supplying the hydraulic oil corresponds to a supply communication section in the present invention. The communication hole 47b that communicates with the hollow section 42b functioning as the oil passage for discharging the hydraulic oil corresponds to a discharge communication section in the present invention.

In the seal device for a hydraulic circuit in accordance with the present invention that is configured as shown in FIGS. 2 and 3, the oil passage that supplies the hydraulic oil to the hydraulic pressure chamber 33 that is the hydraulic actuator and the oil passage that discharges the hydraulic oil from the hydraulic pressure chamber 33 are formed over the boss 25a and the clutch drum 28 as the two members that relatively rotate and cross the gap between the members. However, the gap is sealed by the above-described seal members 45a, 45b in a liquid-tight manner. The oil passages are blocked against a so-called atmospherically open section or the drain portion in a liquid-tight manner. Therefore, leakage of the hydraulic oil can be prevented or restricted. Further, when the hydraulic oil is supplied to the hydraulic pressure chamber 33 or the hydraulic oil is discharged from the hydraulic pressure chamber 33, the hydraulic oil that flows toward the hydraulic pressure chamber 33 or the hydraulic oil that is discharged from the hydraulic pressure chamber 33 not only passes through each of the above-described oil passages but also passes through the groove sections 46a, 46b and the communication holes 47a, 47b from the gap between the boss 25a and the clutch drum 28 (particularly the inner cylinder section 29) as the two members that relatively move. In other words, the hydraulic oil in interiors of the groove sections 46a, 46b and in peripheries of the seal members 45a, 45b is replaced, and heat generated by friction of the seal members 45a, 45b is thereby carried away by the hydraulic oil, thus causing the cooling effect by flow of hydraulic oil. As a result, an excessive increase in the temperature of the seal members 45a, 46b and the hydraulic oil is prevented or restricted, thus resulting in good durability of those. Such a cooling effect can be caused without leakage of the hydraulic oil, and loss of hydraulic pressure or energy can thus be restricted.

Figure 4:
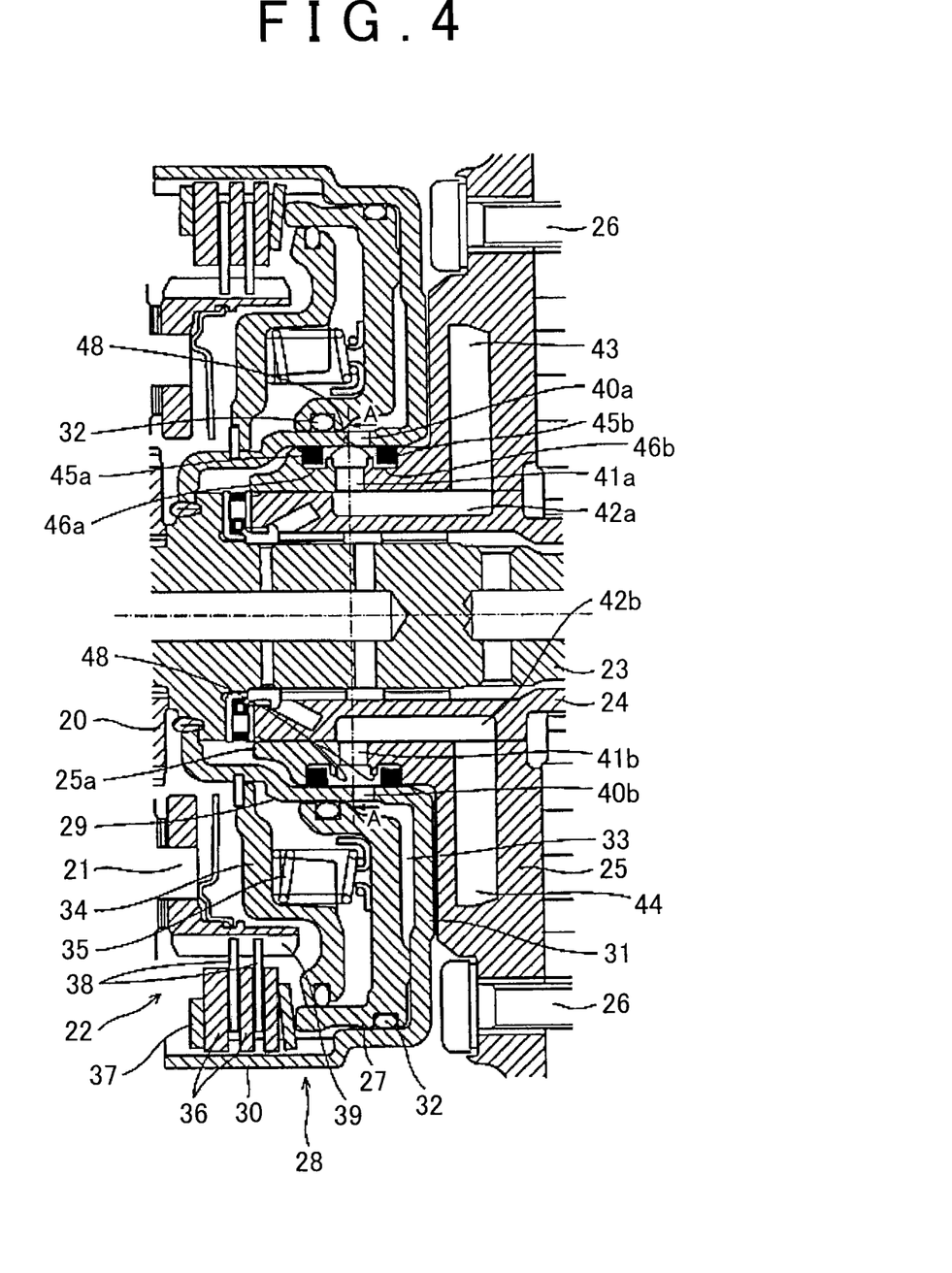
FIG. 4 is a cross-sectional view showing an example where notches are provided as communication sections.
Figure 5:
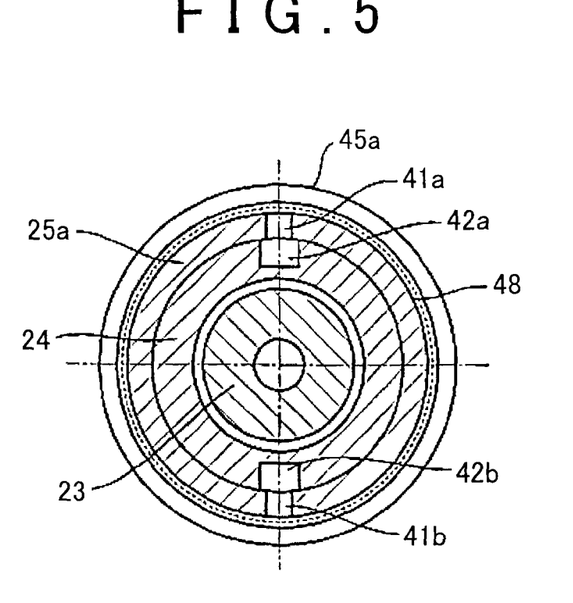
FIG. 5 is a cross-sectional view taken along line A-A of FIG. 4.
Figure 6:
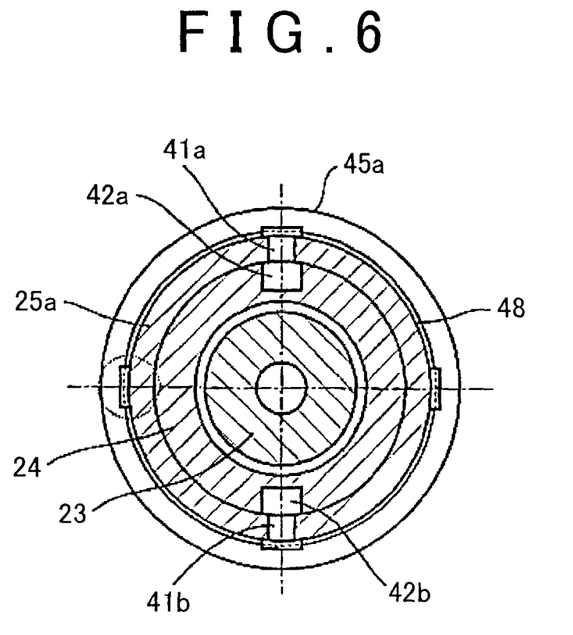
FIG. 6 is a cross-sectional view similar to FIG. 5 for showing another shape of the notch.

In the present invention, the communication section that causes movement of the hydraulic oil in the peripheries of the seal member along with supply of the hydraulic oil to or discharge of the hydraulic oil from the hydraulic actuator is not limited to the above-described communication holes but may be one in a different structure. For example, as shown in FIGS. 4 and 5, notches 48 formed by notching side wall section on the oil passage sides (the through holes 41a, 41b sides) of the side wall section that forms the groove sections 46a, 46b may allow communication between the groove sections 46a, 46b and the oil passages. Because the side wall section remains in a slightly protruding state by formation of the notches 48, when the boss 25a is notched around the whole circumference in a constant height, as shown in FIG. 5, the side wall sections in a constant height remains around the whole circumference of the boss 25a. However, the height to be notched may be changed according to positions in the boss 25a in the circumferential direction. For example, as shown in FIG. 6, the notches 48 may be formed such that the side wall section slightly remains in four positions in the circumferential direction and no side wall section remains in the other positions. In a configuration shown in FIG. 6, the area for communication between the groove sections 46a, 46b and the oil passages becomes large, and the movement (flow) of the hydraulic oil in the peripheries of the groove sections 46a, 46b or the seal members 45a, 45b and the accompanying cooling effect can thus be facilitated.

Figure 7:
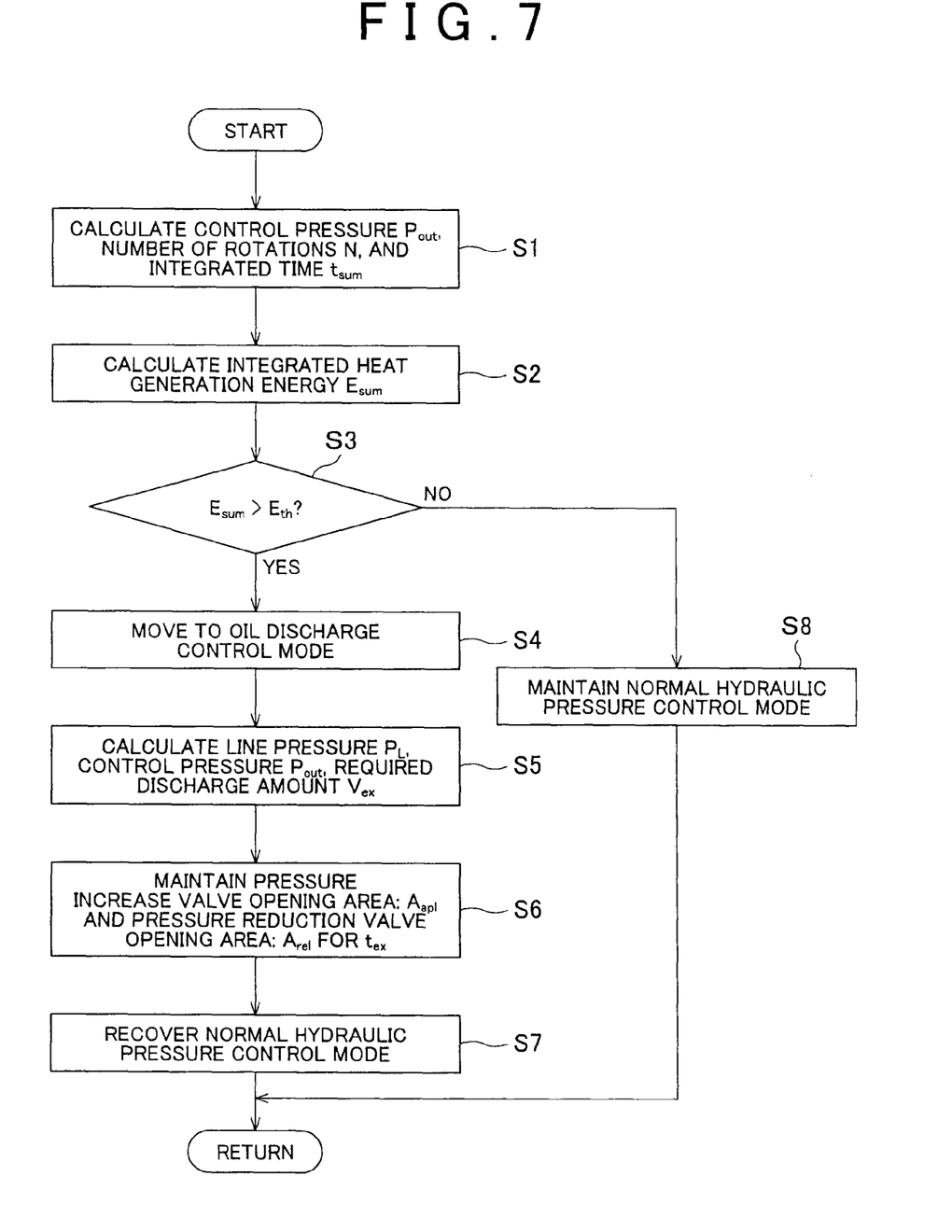
FIG. 7 is a flowchart for illustrating an example of control executed by the seal device in accordance with the present invention.

Incidentally, in the present invention, the cooling effect is caused along with the supply or discharge of the hydraulic oil for making the hydraulic actuator operate. However, the supply or discharge of the hydraulic oil may be performed to cause the cooling effect. Such supply and discharge of the hydraulic oil can be performed by appropriately opening or closing the above-described pressure increase valve 12 and the pressure reduction valve 18. An example of such open-close control will be described with reference to FIG. 7. FIG. 7 is a flowchart for illustrating an example of control that is configured such that a temperature increase is estimated by integrating generated heat energy and the pressure increase valve 12 and the pressure reduction valve 18 are controlled on the basis of the estimation results. This control is repeatedly executed at each prescribed short time. In the example of control, control pressure $P_{out}$, a number of rotations N, and an integrated time $t_{sum}$ are calculated (step S1). The control pressure $P_{out}$ is the hydraulic pressure in the hydraulic actuator 10 or the hydraulic pressure chamber 33 and is detected by the above-described control pressure sensor 17. Further, the number of rotations N is a number of relative rotations between the two members in which the above-described oil passages are formed, is a number of rotations of the clutch drum 28 or the carrier 21 in the above-described forward clutch 22, and can be obtained on the basis of a vehicle speed, a gear ratio, or a number of rotations of the turbine. Moreover, the integrated time $t_{sum}$ is an elapsed time after the clutch drum 28 starts rotating or an elapsed time after the clutch drum 28 keeps rotating from a point of a previous cooling operation, and is a time counted by a timer.

Next, an integrated heat generation energy $E_{sum}$ is calculated (step 2). Heat is generated by friction of the seal members 7, 45a, 45b and shearing of the hydraulic oil. Thus, the control pressure $P_{out}$, the number of rotations N, and the heat generation per unit time are beforehand obtained through an experiment or the like, and the integrated heat generation energy $E_{sum}$ can be calculated on the basis of experimental values or coefficients in the experiment, the control pressure $P_{out}$, the number of rotations N, and the integrated time $t_{sum}$ that are calculated in step S1.

The calculated integrated heat generation energy $E_{sum}$ is compared with a predetermined threshold value $E_{th}$ (step S3). The threshold value $E_{th}$ is an energy threshold value for determining whether or not the control moves to an oil discharge control mode for cooling the hydraulic oil in the seal members 7, 45a, 45b or in their peripheries and can be predetermined on the basis of results and the like of a durability evaluation test with an actual device. If the determination in step S3 is YES because the integrated heat generation energy $E_{sum}$ exceeds the threshold value $E_{th}$, that is, if it is estimated that the temperature of the hydraulic oil in the seal members 7, 45a, 45b or in their peripheries exceeds an allowable temperature, the control moves to the oil discharge control mode (step S4). The control in step 4 is control such as turning on a control flag or starting a related subroutine.

In the oil discharge control mode, a line pressure $P_L$, the control pressure $P_{out}$, and required discharge amount $V_{ex}$ are calculated (step S5). The line pressure $P_L$ can be detected by the above-described line pressure sensor 16, and the control pressure $P_{out}$ can be detected by the control pressure sensor 17. Further, the required discharge amount $V_{ex}$ is a flow amount of the hydraulic oil that is required for maintaining the temperature of the seal members 7, 45a, 45b or their peripheries to a predetermined upper limit temperature or lower and can be predetermined on the basis of results of an evaluation test with the actual device. The required discharge amount $V_{ex}$ may be determined for each of conditions such as an ambient temperature, an operation time of the device, an oil temperature in the oil pan.

Next, control amounts of the pressure increase valve 12 and the pressure reduction valve 18 for allowing flow of the hydraulic oil in the required discharge amount $V_{ex}$ are calculated, and the discharge control on the basis of the control amounts is executed (step S6). The amounts of the hydraulic oil that flow through the pressure increase valve 12 and the pressure reduction valve 18 are substantially determined by their opening areas $A_{apl}$, $A_{rel}$ and the opening time $t_{ex}$. Thus, either one of the opening areas $A_{apl}$, $A_{rel}$ and the opening time $t_{ex}$ is given as a predetermined constant value, and the other is obtained. In an example shown in FIG. 7, while the opening time $t_{ex}$ is predetermined, the opening areas $A_{apl}$, $A_{rel}$ are calculated on the basis of that. In other words, because the required discharge amount $V_{ex}$ and the opening time $t_{ex}$ are known, a flow amount per unit time $Q_{ex}$ can be obtained. The relationship between the flow amount per unit time $Q_{ex}$ and the opening areas $A_{apl}$, $A_{rel}$ for the pressure increase valve 12 is obtained by $$Q_{ex}=V_{ex}/t_{ex}=cA_{apl}\{2(P_L-P_{out})/\rho\}^{1/2}$$

The relationship for the pressure reduction valve 18 is obtained by $$Q_{ex}=V_{ex}/t_{ex}=cA_{rel}(2P_{out}/\rho)^{1/2}$$

Accordingly, the opening areas $A_{apl}$, $A_{rel}$ can be obtained on the basis of the relationship equations. In each of the equations, c is a flow amount coefficient that is determined by a condition of flow of the hydraulic oil, and ρ is a density.

The pressure increase valve 12 and the pressure reduction valve 18 are controlled to obtain the opening areas $A_{apl}$, $A_{rel}$ obtained as described above, and this state is retained for a prescribed opening time $t_{ex}$. Accordingly, heat in the seal members 7, 45a, 45b and in their peripheries is carried away by the discharged hydraulic oil. Such a cooling effect thus prevents or restricts a temperature increase of the hydraulic oil in the seal members 7, 45a, 45b and their peripheries to the allowable temperature or higher. This results in good durability of the seal members 7, 45a, 45b or the hydraulic oil.

After the control of step 6 is performed, a normal hydraulic pressure control mode is recovered (step S7), and the control returns. The normal hydraulic pressure control mode is a mode in which the discharge control of the hydraulic oil to cause the cooling effect is not performed and control for setting the hydraulic pressure demanded by the hydraulic actuator 10 or the hydraulic pressure chamber 33 is performed. Further, if the determination in above-described step S3 is NO, in other words, the integrated heat generation energy $E_{sum}$ is the threshold value $E_{th}$ or lower, the normal hydraulic pressure control mode is maintained (step S8).

Figure 8:
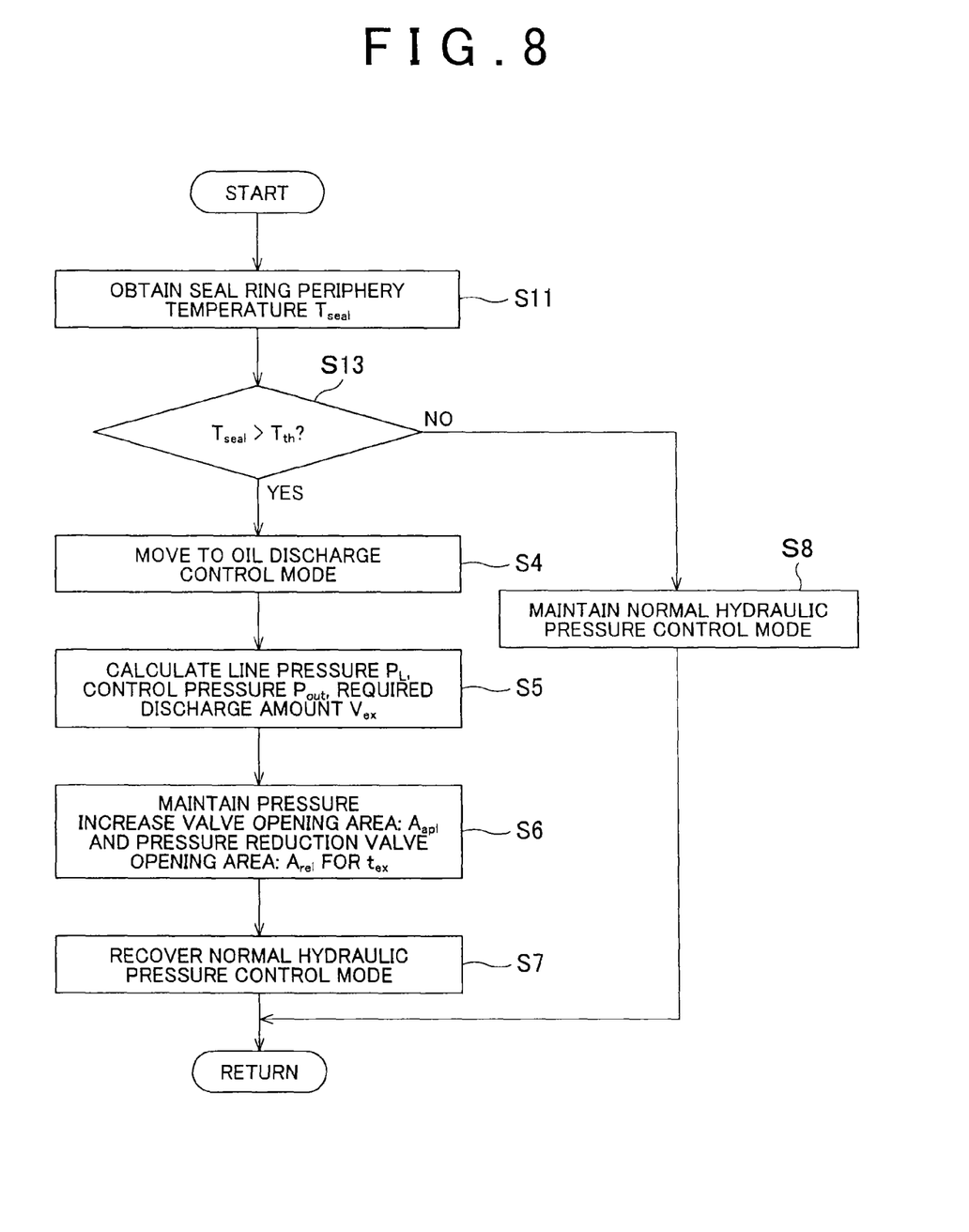
FIG. 8 is a flowchart for illustrating another example of control executed by the seal device in accordance with the present invention.

The control for allowing the discharge or flow of the hydraulic oil by opening the pressure increase valve 12 and the pressure reduction valve 18 for cooling may be executed while the temperature increase is estimated as described above. The estimation may be made on the basis of the temperature of the peripheries of the seal members 7, 45a, 45b other than the above-described integrated heat generation energy $E_{sum}$. An example of such control is shown in FIG. 8. A temperature $T_{seal}$ of the peripheries of the seal members (seal rings) 7, 45a, 45b is first obtained (step S11). This can be performed by disposing a prescribe temperature sensor in the peripheries of the above-described seal members 7, 45a, 45b and detecting the temperature by the temperature sensor.

A determination is made about whether or not the temperature $T_{seal}$ is a predetermined reference temperature $T_{th}$ or higher (step S13). The reference temperature $T_{th}$ is a determination reference temperature for determining whether or not the control moves to the oil discharge control mode for cooling the hydraulic oil on the seal member 7, 45a, 45b or in their peripheries and can be predetermined on the basis of results and the like of the durability evaluation test with the actual device. If the determination in step S13 is YES because the detected temperature $T_{seal}$ exceeds the reference temperature $T_{th}$, control similar to step S4 or step S7 that are described above and shown in FIG. 7, and the hydraulic oil of the required discharge amount $V_{ex}$ is allowed to flow. Further, if the determination in step S13 is NO because the detected temperature $T_{seal}$ is the reference temperature $T_{th}$ or lower, the control progresses to step S8, and the normal hydraulic pressure control mode is maintained.

In examples of the control shown in FIGS. 7 and 8, the opening time $t_{ex}$ is predetermined, and the opening areas $A_{apl}$, $A_{rel}$ are obtained on the basis of the required discharge amount $V_{ex}$. However, when the opening areas $A_{apl}$, $A_{rel}$ of the pressure increase valve 12 and the pressure reduction valve 18 are predetermined, the opening time $t_{ex}$ may be calculated on the basis of the required discharge amount $V_{ex}$. Further, in each of the specific examples, the oil passage for supply and the oil passage for discharge are separately and independently provided from each other. However, in the present invention, a configuration is provided such that the supply and the discharge of the hydraulic oil are performed via the same oil passage. Because such a configuration produces flow of the hydraulic oil in the groove section connected to the oil passage via the communication section, the cooling effect can be caused, and an excessive temperature increase in at least either one of the seal members and the hydraulic oil can be prevented or restricted. Moreover, when the hydraulic oil is made flow in order to cause the cooling effect, the control may be made to open either one of the pressure increase valve and the pressure reduction valve instead of opening both of them.

The invention claimed is:

1. A device for a hydraulic circuit comprising:
    a supply passage configured to supply hydraulic oil to a hydraulic actuator operated by hydraulic pressure, and formed over at least two members that relatively move;
    a discharge passage configured to discharge the hydraulic oil from the hydraulic actuator, and formed over the at least two members;
    a seal member that seals a gap between the at least two members in a liquid-tight manner is disposed in an interior of a groove that is formed in at least one of the at least two members;
    a supply communication section that allows the groove section to communicate with the supply passage at a position midstream of the supply passage; and
    a discharge communication section that allows the groove section to communicate with the discharge passage at a position midstream of the discharge passage,
    wherein the seal member continuously seals the gap,
    wherein the hydraulic actuator includes: a cylinder section that is formed with an inner cylinder section, an outer cylinder section, and a side wall section, the side wall section connecting the inner cylinder section and the outer cylinder section; and a piston that is housed in an interior of the cylinder section to reciprocally move in a liquid-tight manner,
    the inner cylinder section is fitted on a hollow shaft section in which the hydraulic oil flows through a hollow section on an inner peripheral side of the inner cylinder section,
    the supply passage and the discharge passages are formed to pass through the hollow shaft section and the inner cylinder section in a racial direction, and
    the groove section is formed on the supply passage and the discharge passage in an outer peripheral section of the hollow shaft section.

2. The device for a hydraulic circuit according to claim 1, wherein the supply communication section and the discharge communication section each include a through hole that allows communication between the groove section and the hollow section.

3. The device for a hydraulic circuit according to claim 1, wherein the supply communication section and the discharge communication section each include a notch in which the side wall section that defines the groove section is notched to allow communication between the groove section and each of the supply passage and the discharge passage.

4. A device for a hydraulic circuit comprising:
a supply passage configured to supply hydraulic oil to a hydraulic actuator operated by hydraulic pressure, and formed over at least two members that relatively move;
a discharge passage configured to discharge the hydraulic oil from the hydraulic actuator, and formed over the at least two members;
a seal member that seals a gap between the at least two members in a liquid-tight manner is disposed in an interior of a groove section that is formed in at least one of the at least two members;
a supply communication section that allows the groove section to communicate with the supply passage at a position midstream of the supply passage; and
a discharge communication section that allows the groove section to communicate with the discharge passage at a position midstream of the discharge passage,
wherein the seal member continuously seals the gap,
wherein the at least two members includes a shaft member and a rotating member that is fitted on an outer peripheral side of the shaft member and has the hydraulic actuator,
the supply passage is formed to pass through an interior of the shaft member, to include an opening that opens on an outer peripheral surface of the shaft member, and further to pass through a section of the rotating member so as to allow communication between the opening of the supply passage and the hydraulic actuator,
the discharge passage is formed to pass through the interior of the shaft member, to include an opening that opens in a position offset from the opening of the supply passage in a circumferential direction, and to pass through a section of the rotating member so as to allow communication between the opening of the discharge passage and the hydraulic actuator, and
the seal member is disposed between the shaft member and the rotating member.

5. The device for a hydraulic circuit according to claim 4, wherein the supply passage and the discharge passage are formed in symmetrical positions about a center of the shaft member in an outer peripheral section of the shaft member, and the supply communication section is formed to adjoin the supply passage, and the discharge communication section is formed to adjoin the discharge passage.

6. The device for a hydraulic circuit according to claim 4, wherein the rotating member includes a clutch drum that houses, in an interior thereof, a piston that moves in an axial direction by hydraulic pressure.

7. A device for a hydraulic circuit comprising:
a supply passage configured to supply hydraulic oil to a hydraulic actuator operated by hydraulic pressure, and formed over at least two members that relatively move;
a discharge passage configured to discharge the hydraulic oil from the hydraulic actuator, and formed over the at least two members;
a seal member that seals a gap between the at least two members in a liquid-tight manner is disposed in an interior of a groove section that is formed in at least one of the at least two members;
a supply communication section that allows the groove section to communicate with the supply passage at a position midstream of the supply passage;
a discharge communication section that allows the groove section to communicate with the discharge passage at a position midstream of the discharge passage;
a pressure increase valve that selectively allows communication between the supply passage and a hydraulic pressure source; and
a pressure reduction valve that selectively allows communication between the discharge passage and a prescribed chain portion,
wherein the seal member continuously seals the gap, and
wherein the device is configured such that when an estimation that a temperature of the hydraulic oil contacting the seal member increases to a prescribed value or higher is made, at least either one of the pressure increase valve and the pressure reduction valve is opened, and flow of the hydraulic oil is caused in the supply passage, discharge passage, and the groove section that communicates via the supply communication section and the discharge communication section.

* * * * *